United States Patent
Wohlfeil

(10) Patent No.: US 10,914,898 B2
(45) Date of Patent: Feb. 9, 2021

(54) PHOTONIC CHIP/OPTICAL DEVICE FOR ALIGNING AND CONNECTING AN OPTICAL FIBER AND A PHOTONIC INTEGRATED WAVEGUIDE AND METHOD OF ITS PRODUCTION

(71) Applicant: ADVA Optical Networking SE, Meiningen (DE)

(72) Inventor: Benjamin Wohlfeil, Erfurt (DE)

(73) Assignee: ADVA Optical Networking SE, Meiningen (DE)

( * ) Notice: Subject to any disclaimer, the term of this patent is extended or adjusted under 35 U.S.C. 154(b) by 0 days.

(21) Appl. No.: 15/988,379

(22) Filed: May 24, 2018

(65) Prior Publication Data
US 2018/0372960 A1     Dec. 27, 2018

(30) Foreign Application Priority Data

Jun. 21, 2017 (EP) .................................. 17177234

(51) Int. Cl.
| | |
|---|---|
| G02B 6/30 | (2006.01) |
| G02B 6/00 | (2006.01) |
| G02B 6/12 | (2006.01) |
| G02B 6/36 | (2006.01) |
| G02B 6/42 | (2006.01) |

(52) U.S. Cl.
CPC ............. *G02B 6/3652* (2013.01); *G02B 6/30* (2013.01); *G02B 6/3684* (2013.01); *G02B 6/4233* (2013.01)

(58) Field of Classification Search
CPC .......... G02B 6/30; G02B 6/136; G02B 6/423; G02B 6/3652; G02B 6/4233; G02B 6/3684

USPC ................................ 385/13, 14, 49, 136, 137
See application file for complete search history.

(56) References Cited

U.S. PATENT DOCUMENTS

| | | | |
|---|---|---|---|
| 5,359,687 A | 10/1994 | McFarland et al. | |
| 6,266,472 B1 * | 7/2001 | Norwood | G02B 6/30 385/137 |
| 9,348,094 B1 * | 5/2016 | Liu | G02B 6/3636 |
| 2002/0191916 A1 * | 12/2002 | Frish | G02B 6/1228 385/43 |

(Continued)

FOREIGN PATENT DOCUMENTS

| | | |
|---|---|---|
| FR | 2756056 A1 | 5/1998 |
| JP | H590407 A | 4/1993 |
| WO | 2007047304 A1 | 4/2007 |

*Primary Examiner* — Kaveh C Kianni
*Assistant Examiner* — Hung Q Lam
(74) *Attorney, Agent, or Firm* — The Webb Law Firm

(57) ABSTRACT

A photonic chip includes a connecting means, a substrate, and a waveguide layer. The photonic integrated waveguide and the optical fiber each have a front end portion. The connecting means includes a groove configured to receive the front end portion of the optical fiber. The groove is essentially U-shaped in its cross section, and the groove has a bottom surface and two inner side surfaces. A least one of both inner side surfaces of the U-shaped groove has a coating of an elastic material configured to hold in place the optical fiber after it is inserted into the groove. The invention further relates to an optical device which includes a photonic chip and an optical fiber, as well as a method or production of such a photonic chip.

20 Claims, 9 Drawing Sheets

(56) References Cited

U.S. PATENT DOCUMENTS

2006/0215964 A1 9/2006 Kuroda et al.
2008/0044126 A1* 2/2008 Costa .................. G02B 6/1228
385/14

* cited by examiner

PHOTONIC CHIP/OPTICAL DEVICE FOR ALIGNING AND CONNECTING AN OPTICAL FIBER AND A PHOTONIC INTEGRATED WAVEGUIDE AND METHOD OF ITS PRODUCTION

CROSS-REFERENCE TO RELATED APPLICATION

This application claims priority to European Patent Application No. 17 177 234.6 filed Jun. 21, 2017, the disclosure of which is hereby incorporated in its entirety by reference.

BACKGROUND OF THE INVENTION

Field of the Invention

The present invention relates to a photonic chip comprising a connecting means for aligning and connecting an optical fiber to a photonic integrated waveguide on the photonic chip. Further, the present invention relates to an optical device comprising a photonic chip and an optical fiber. Moreover, the present invention also relates to a method of producing such a photonic chip.

Description of Related Art

Coupling between an integrated waveguide located on a photonic chip and an optical fiber is usually performed actively, meaning that the relative position between integrated waveguide and optical fiber is adjusted while light is passed through both and detected at one end. Usually, the optical fiber and the integrated waveguide are not in direct contact in these arrangements, giving the adjustment process between integrated waveguide and optical fiber six degrees of freedom, i.e. in all three translational and all three rotational degrees of freedom. In order to transmit the maximum power over the optical coupling, the optical axes of the integrated waveguide and the optical fiber must be optimally aligned with each other. Once the detected power reaches its maximum, the optimal relative position between optical fiber and integrated waveguide has been found and both can be fixed with respect to each other. The required accuracy depends on the dimensions of optical fiber (approx. 8-10.5 µm core diameter) and integrated waveguide (varying sizes and geometries depending—among others—on material and lithography; edge lengths between a few microns and a few hundred nanometers are common), where smaller waveguides usually require higher alignment precision.

In order to align the optical fiber with high precision in the plane perpendicular to the optical axis, V-grooves have been demonstrated, which are etched into the chip, to form a guide for the optical fiber. The geometry of a V-groove is created by using a crystalline substrate having a desired orientation and appropriate etching substances (e.g. potassium hydroxide, KOH). Once the groove has been created and the optical fiber has been inserted into the groove and optimally aligned with the integrated waveguide (or aligned with a sufficiently high accuracy), the fiber is fixed by means of a cover or glue. Etching V-shaped grooves is, however, no standard etching method, and requires a relatively complex process. Moreover, an additional step of fixating the optical fiber in its correct position is required. The use of a cover or a glue brings along the disadvantage of having undesired influence on the position of the optical fiber, resulting in a misalignment of the optical fiber with respect to the integrated waveguide.

It is therefore an object of the present invention to provide a photonic chip for aligning and optically connecting an optical fiber to a photonic integrated waveguide that is provided on the photonic chip in a very precise manner, wherein the photonic chip can be manufactured by using standard lithographic methods for etching a groove in which the optical fiber can be placed and fixed to the photonic chip. It is further desired that the photonic chip allows the fixation of the optical fiber on the photonic chip without using additional fixating means, like a cover or glue, at least in such a manner that the desired position is not deteriorated when an additional fixating means is additionally applied. Further, it is an object of the invention to provide an optical device comprising such a photonic chip and an optical fiber, wherein the optical fiber is connected to a photonic integrated waveguide provided on the photonic chip.

SUMMARY OF THE INVENTION

The photonic chip according to the invention comprises a connecting means for aligning and connecting an optical fiber to a photonic integrated waveguide provided on the chip. Further, the photonic chip comprises a substrate and a waveguide layer which is provided on the substrate and which defines the photonic integrated waveguide. Preferably, the waveguide layer is provided on (at least) one side of or within an upper portion of the substrate neighboring the upper surface of the substrate. The photonic integrated waveguide and the optical fiber each have a front end portion, each front end portion having an optical axis and a front surface. The connecting means comprises a groove configured to receive a front end portion of the optical fiber, in such a way that the front surfaces of the photonic integrated waveguide and the optical fiber are positioned opposite each other and that the optical axes of the photonic integrated waveguide and the optical fiber are essentially aligned with each other.

The photonic chip according to the present invention is characterized in that the groove is essentially U-shaped in its cross section, the groove having a bottom surface and two inner side surfaces, and at least one of both inner side surfaces of the U-shaped groove having a coating of an elastic material configured to hold in place the optical fiber after it has been inserted into the groove.

It shall be noted at this point that the term "connecting means" comprises all parts of the photonic chip, which are configured to receive the front end portion of the optical fiber, namely, the groove and the coating of the groove, i.e. the connecting means may consist of the groove and the coating of the groove.

It shall further be noted that the invention is applicable to all kinds of photonic chips, regardless of their manufacturing technique, as long as the chip allows the process of etching a U-shaped groove. The photonic chip may be manufactured in the so-called silica on silicon technique, in which one or more layers of silica or doped silica are provided on a silicon substrate in order to form one or more photonic integrated waveguides or other optical components. This technique is advantageous over the longer known technique that uses a glass substrate in which optical waveguides are created by using ion exchange technologies. Also, the so-called silicon on insulator technique may be used to manufacture the photonic chip according to the invention. This technique uses one or more layers of silicon for creating a waveguide layer (i.e. the waveguide layer may consist of more than one partial layers). The photonic waveguides or other optical elements or components are created by etching processes that create the desired structures in the waveguide layer.

The U-shaped groove brings along the advantage that it may be produced by lithographic methods which are easy to perform and which are also used for producing other elements or portions of the photonic chip, such as the photonic integrated waveguide in or on the waveguide layer. That is, the photonic chip may be produced much easier and cost-saving than a chip which has a V-shaped groove for receiving the front end portion of the optical fiber.

Moreover, the coating of an elastic material on at least one of both inner side surfaces of the U-shaped groove has the function that the fiber can be held in place or even clamped in between the coatings of the two inner side surfaces of the U-shaped groove. By doing so, the optical fiber is fixed and held in place on the chip and it is not mandatorily necessary to additionally fix the optical fiber using a cover or a glue. Nevertheless, in one embodiment of the present invention, the optical fiber may additionally be fixed with a cover or glue. In such a case, the clamping of the optical fiber in the U-shaped groove serves to initially fix the fiber to the chip in such a manner that this initial position is not deteriorated during the step of mounting the cover or applying the glue or any other appropriate fixating means.

According to an embodiment of the photonic chip of the present invention both inner side surfaces of the U-shaped groove have a coating of an elastic material configured to hold in place the optical fiber after it is inserted into the groove.

According to an embodiment of the photonic chip of the present invention, the groove is preferably provided on the waveguide layer side of the photonic chip, and the bottom surface of the groove is preferably parallel to the optical axis of the end portion of the photonic integrated waveguide. This ensures that the optical axis of the optical fiber can be aligned with the optical axis of the photonic integrated waveguide.

According to a further embodiment of the photonic chip of the present invention, the groove preferably extends from a lateral end of the photonic chip to the front surface of the end portion of the photonic integrated waveguide. In other words, the groove only extends along a part of the entire waveguide layer. That is, the groove is configured such that a front end portion of the optical fiber is receivable therein and the main portion of the optical fiber leads away from the lateral end of the photonic chip.

According to a further embodiment of the photonic chip of the present invention, the inner side surfaces of the U-shaped groove preferably have an essentially constant distance which is greater than the diameter of the front end portion of the optical fiber. Further, it is preferred that the coating(s) of the inner side surface(s) has/have an essentially constant thickness preferably chosen in such a way that the distance of the inner surfaces after coating to each other (without the fiber being inserted) is smaller than the diameter of the front end portion of the optical fiber. When the distance of the inner surfaces after coating is smaller than the diameter of the front end portion of the optical fiber, the optical fiber is clamped between the inner side surfaces of the groove (after being coated) and the optical fiber is fixed and held in place on the photonic chip.

According to a further embodiment of the photonic chip of the present invention, preferably the distance between the bottom surface of the groove and the optical axis of the front end portion of the photonic integrated waveguide is essentially equal to the radius of the optical fiber. The reason for this is that the optical axis of the optical fiber is located in the center of the circular cross section of the optical fiber with high accuracy. In case the distance between the bottom surface of the groove and the optical axis of the front end portion of the photonic integrated waveguide is essentially equal to the radius of the optical fiber, the optical axes of the photonic integrated waveguide and of the optical fiber are essentially at the same height with respect to their extension directions. This allows an excellent alignment of the optical axis of the optical fiber with respect to the optical axis of the integrated waveguide.

According to a further embodiment of the photonic chip of the present invention, the coatings of the inner side surfaces of the U-shaped groove are preferably configured such that the optical fiber is clamped between the coated side surfaces of the U-shaped groove. The clamping force can be chosen in such a way, especially by choosing the elasticity of the coating material, its thickness and the difference between the distance of the inner side surfaces of the coatings (without the optical fiber being inserted into the groove) and the outer diameter of the optical fiber, that no additional fixating means is necessary or an additional fixating means is only required in order to assure a sufficiently high long-term stability or to assure that the optical fiber cannot be unintentionally torn out of the groove.

According to a further embodiment of the photonic chip of the present invention, the coatings of both sides of the side surfaces of the U-shaped groove preferably have essentially the same thickness. Moreover, the coatings of both inner side surfaces are preferably of the same material. It is further preferred that the coatings of the inner side surfaces are configured such that the clamping forces of both sides are essentially the same.

The photonic integrated waveguide is preferably located on the surface of the waveguide layer and has an elongated form, the extension direction of which is preferably substantially in alignment with the extension direction of the groove.

According to a further embodiment of the photonic chip of the present invention, the front end portion of the photonic integrated waveguide may have the form of a taper. The tip of the taper is located opposite the front end surface of the optical fiber. In this way, the mode field diameter or spot size of the guided mode of the photonic integrated waveguide and the mode field diameter or spot size of the optical fiber can be matched.

According to the invention, the photonic chip may be configured to receive the front end portion of a lensed and/or tapered optical fiber. Both measures or a combination thereof, i.e. using a lensed and/or tapered optical fiber, can be used to match the mode field diameter or spot size of the optical fiber and the mode field diameter or spot size of the guided mode of the photonic integrated waveguide.

The substrate of the photonic chip according to the present invention preferably has a thickness in the range of 300 μm to 1200 μm, more preferred in the range of 500 μm to 1000 μm, wherein "thickness" means the distance between the lower surface of the waveguide layer and the lower surface of the substrate opposite the waveguide layer. The substrate may comprise or may consist of every material which is known in the art as a suitable material for a substrate for a photonic chip, such as silicon or glass. Preferably, the substrate has a planar, plate-like structure.

The waveguide layer of the photonic chip according to the present invention may have a thickness in the range of 100 nm to 10 μm depending on the wavelength of the light to be guided and the refractive index contrast of the material system used. The waveguide layer may comprise or may consist of every material or material combination, which is known in the art as a suitable material for a waveguide for a photonic chip, such as silicon or doped silicon.

If the photonic chip is manufactured in silicon on insulator technique, it may comprise, in addition to the substrate and the waveguide layer, an insulator layer, which is provided between the substrate and the waveguide layer. This layer is preferably a layer of a buried oxide. The thickness of this layer may be in the range of 0.5 µm and 5 µm.

The groove of the photonic chip according to the present invention may have a width with respect to its cross section in a range of 70 µm to 200 µm, depending on the outer diameter of the optical fiber to be inserted into the groove. The depth of the groove of the photonic chip measured from the optical axis of the photonic integrated waveguide of the photonic chip according to the present invention may lie in the range of 50 µm to 120 µm, depending on the outer diameter of the optical fiber to be inserted into the groove. It is preferred that the thicknesses of the layers of the photonic chip and depth of the groove are chosen such that the bottom surface of the groove is formed by the material of the substrate.

The length of the groove in its extension direction depends on the dimensions of the photonic chip, but is usually in the range of 0.5 mm to 5 mm.

According to a further embodiment of the photonic chip of the present invention, the groove may have one or more additional alignment stops which are configured such that the optical fiber is fixed in the direction of its extension, in the direction of the optical axis. The alignment stop(s) may be formed as axial step(s) inside the groove, wherein the one or more alignment stops reduce the cross section of the U-shaped groove in such a way that the front surfaces or the alignment stops (which generally are in the same plane perpendicular to the longitudinal extension direction of the groove) form a stop for the front surface of the optical fiber to be inserted into the groove. The alignment stops may be realized as steps or shoulders in the inner side surfaces of the U-shaped groove and/or as a step in the bottom wall of the U-shaped groove.

The material of the coating of the inner side surfaces of the groove is preferably a material having a higher elasticity than the material(s) of the photonic chip forming the side walls of the U-shaped groove, namely, the materials of the substrate, the waveguide layer and—if present—the insulator layer and the optical fiber. The material of the coating may be a plastic material, such as e.g. poly methyl methacrylate (PMMA).

According to a further embodiment of the photonic chip of the present invention, it may comprise a passivation layer. The passivation layer is preferably provided on the waveguide layer, e.g. multiple $SiO_2$ layer that may also contain metallization layers and vias for electrical contacting.

A further embodiment of the present invention relates to an optical device comprising a photonic chip and an optical fiber connected to a photonic integrated waveguide provided on the photonic chip by connecting means. The photonic chip comprises a substrate and a waveguide layer which is provided on the substrate or within an upper portion thereof and which defines the photonic integrated waveguide. The photonic integrated waveguide and the optical fiber each have a front end portion, each front end portion having an optical axis and a front surface. The connecting means comprise a groove configured to receive a front end portion of the optical fiber, in such a way that the front surfaces of the photonic integrated waveguide and the optical fiber are positioned opposite each other and that the optical axes of the photonic integrated waveguide and the optical fiber are essentially aligned with each other. The optical device according to the present invention is characterized in that the groove is essentially U-shaped in its cross section, that the groove has a bottom surface and two inner side surfaces, and that at least one of both inner side surfaces of the U-shaped groove has a coating of an elastic material configured to hold in place the optical fiber after it is inserted into the groove.

All definitions and preferred embodiments which are stated above in relation to the photonic chip according to the invention also apply to the photonic chip present in the optical device according to the present invention. It is thus preferred that the photonic chip in the optical device according to the present invention is a photonic chip according to the present invention.

According to one embodiment of the optical device of the present invention, the front end portion of the optical fiber may have a tapered front end portion and/or a lensed tip at the end of the front end portion. As mentioned above, this reduces the mode field diameter of the fiber mode and allows a more precise and efficient coupling with the photonic integrated waveguide of the photonic chip. In a preferred embodiment, the optical fiber in the optical device according to the present invention is a single-mode fiber.

According to a further embodiment of the optical device of the present invention, the front end portion of the optical fiber may be additionally mechanically fixated to the chip, preferably by gluing.

The present invention also relates to a method of producing a photonic chip according to the present invention, comprising the following steps:

(a) providing a photonic chip comprising a substrate and a waveguide layer which is provided on the substrate or within an upper portion thereof and which defines a photonic integrated waveguide, wherein the photonic integrated waveguide has a front end portion, which has a front surface and an optical axis;

(b) etching a U-shaped groove having a bottom surface and two inner side surfaces into the photonic chip, the groove essentially extending from the front surface of the photonic integrated waveguide front end portion in the direction of the optical axis of the photonic integrated waveguide front end portion; and (c) applying a coating of an elastic material on at least one of the inner side surfaces of the U-shaped groove, (d) wherein the groove and the coatings of the inner side surfaces are configured to receive and hold in place a front end portion of an optical fiber.

Apart from the groove, the photonic chip provided in step (a) of the method according to the invention is the same as the photonic chip according to the invention, i.e. all definitions and preferred embodiments which are stated above in relation to the photonic chip according to the invention also apply to the photonic chip provided in step (a) of the method according to the present invention.

The etching process in step (b) of the method according to the present invention is preferably carried out with the aid of an appropriate etching agent.

The step (c) of the method according to the present invention of applying a coating of an elastic material on at least one of the inner side surfaces of the U-shaped groove is preferably carried out by filling the groove with the elastic material and subsequently removing a central portion of the elastic material by etching, in such a way that the coating remains on at least one of the inner side surfaces.

According to a further embodiment of the method of the present invention, the etching of the elastic material is preferably carried out by using an etching process, preferably an etching material, which does not attack the material of the photonic chip, especially the material of the substrate thereof. Such an etching material depends on the coating material used.

BRIEF DESCRIPTION OF THE DRAWINGS

Further objects and advantages of the present invention will become apparent from the following description of the preferred embodiments that are given by way of example with reference to the accompanying drawings, wherein.

DESCRIPTION OF THE INVENTION

Figure 1:
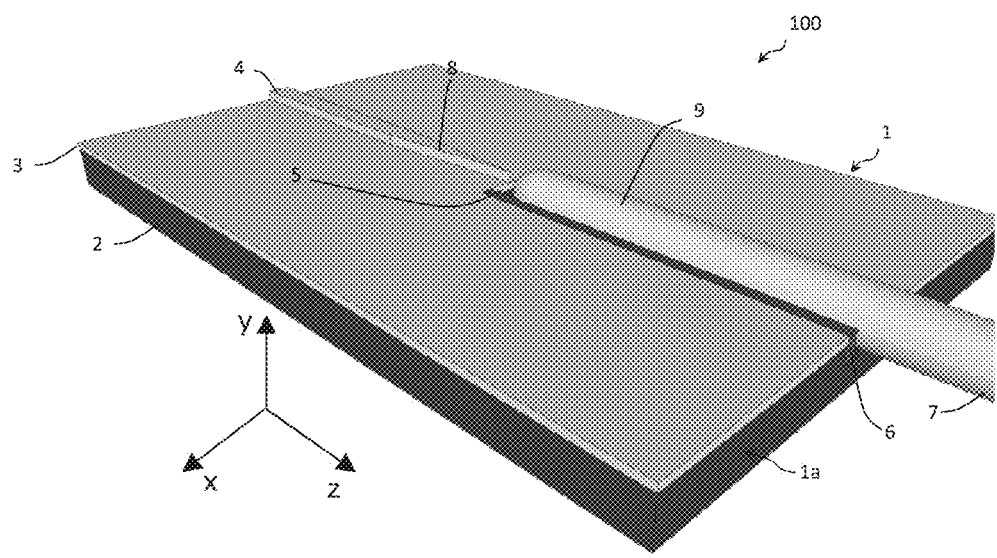
FIG. 1 shows an isometric view of a photonic chip according to the invention to which an optical fiber is attached.

FIG. 1 shows an isometric view of a portion of a photonic chip 1 according to the invention. For reasons of simplicity, FIG. 1 merely shows a portion of the photonic chip that is of interest for the present invention. Of course, the photonic chip may comprise further components or elements.

As apparent from FIG. 1, the photonic chip 1 comprises a substrate 2 (shown in part, only), which is preferably a silicon substrate. The substrate 1 is preferably planar and has a constant thickness (in the direction of an axis y). The substrate is extended in a plane which is formed by two axes x and z, which are perpendicular to each other and to the axis y. On the upper surface of the substrate 2, a waveguide layer 3 is provided. The photonic chip 1 further comprises a photonic integrated waveguide 4, which is part of the waveguide layer 3. The photonic integrated waveguide 4 preferably extends from one lateral end 1a of the photonic chip 1 to an inward portion of the photonic chip 1, i.e. a part of the chip where the groove 5 ends (the photonic chip 1 may extend in all other directions apart from the lateral end 1a). The portion of the photonic integrated waveguide 4 shown in FIG. 1 extends in the direction of the z-axis, which is also designated as optical axis or axis of propagation of the optical field guided by the photonic integrated waveguide 4. As shown in FIG. 1, the photonic integrated waveguide 4 may have the form of a taper at its front end portion 8. The tip of the tapered front end portion 8 of the photonic integrated waveguide 4 ends at the front end of the groove 5.

The groove 5 has a U-shaped cross section in the plane perpendicular to its extension direction (i.e. to the z-axis) and extends from the lateral end 1a of photonic chip 1 to the front end of the photonic integrated waveguide 4. Side surfaces 10 of the groove 5 are coated with a material which has an elasticity higher than the material of the substrate 2 and the layer(s) of the photonic chip 1 and also higher than the material of the optical fiber (in general, glass). The material of the coating 6 may be poly methyl methacrylate. The thickness of the coatings may be essentially identical and constant.

As shown in FIG. 1, a front end portion 9 of an optical fiber 7 is received within the groove 5 of the photonic chip 1. The material and the thickness of the coating 6 may be chosen in such a way that the optical fiber 6 (i.e. the respective end portion thereof) is held in place within the groove 5. In order to achieve this, the distance between the inner surfaces of the coatings 6 (without the optical fiber 7 being inserted) is chosen smaller than the outer diameter of the optical fiber 7 by an appropriate amount (referred to as delta in the following). The parameters coating material, thickness of the coatings and delta can be chosen in such a way that the forces exerted onto the optical fiber 7 are so high that the optical fiber 7 is not only held in place (and positioned with respect to the photonic optical waveguide) but clamped in the groove 5. The clamping forces may be so high that no other measures are necessary to fixate the fiber to the photonic chip 1.

In this way, an alignment of the optical axis of the optical fiber 7 and the optical axis of the photonic integrated waveguide 4 as well as a fixation of the optical fiber 7 and the photonic chip 1 can be achieved by simply inserting the optical fiber 7 into the groove 5.

Figure 2:
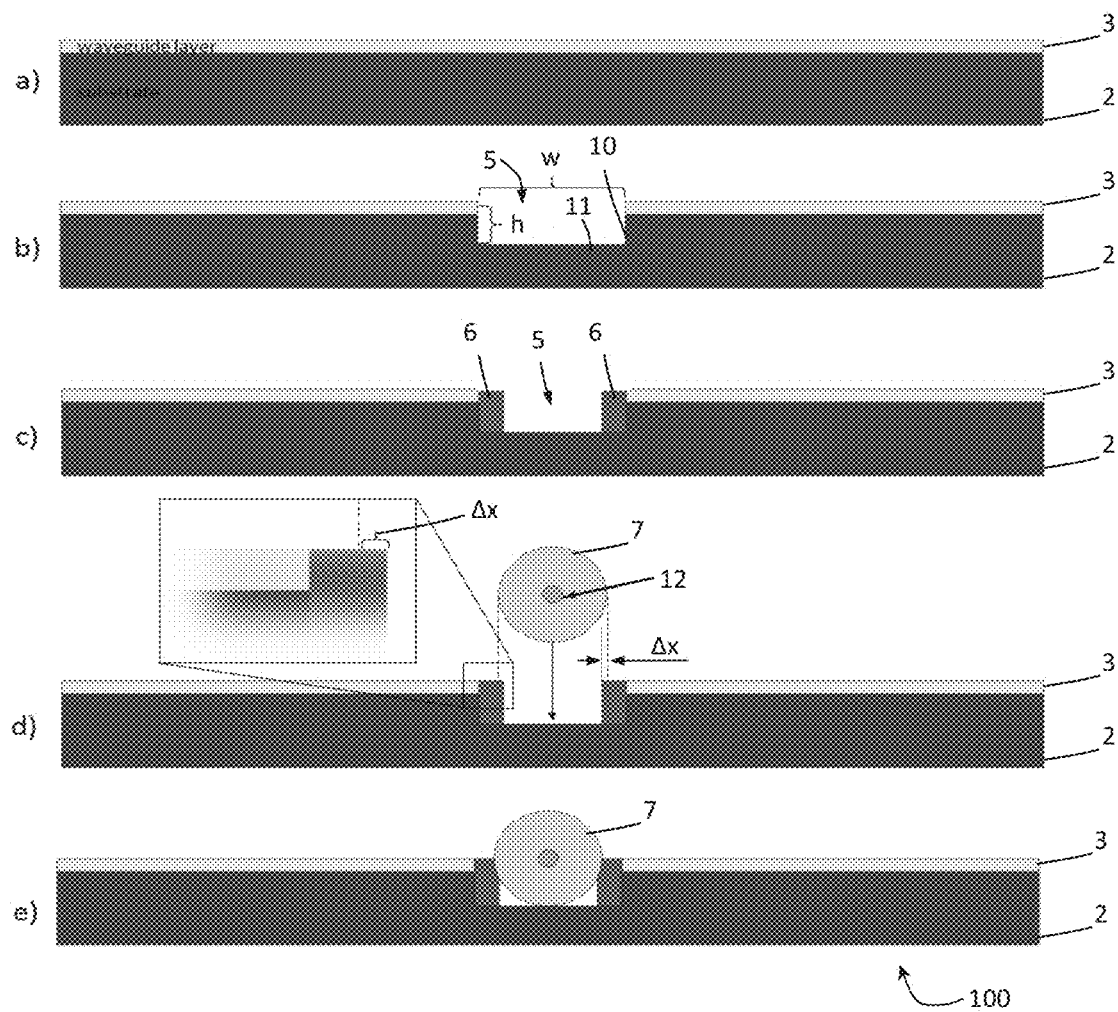
FIG. 2 shows cross-sectional views of a photonic chip wherein a groove is etched and a fiber is attached.

FIG. 2 shows different cross-sectional views of the photonic chip 1 in different states of production. FIG. 2, state a) shows the initial state of the photonic chip before the groove 5 is created. For the sake of simplicity, FIG. 2 shows the waveguide layer 3 as a single layer. In this initial state, the photonic chip comprising the substrate 2 and the waveguide layer 3 may be readily manufactured apart from the groove 5. However, if appropriate, the steps of manufacturing the groove may be combined with other manufacturing steps for creating the photonic chip.

The photonic chip 1 of FIG. 2, state a) is used to etch a U-shaped groove therein. The groove has a width w and a depth h. The width w is larger than the outer diameter of the optical fiber 7 to be received in the groove 5. Of course, usual known masking and etching techniques may be used in order to create the U-shaped groove 5 having the desired width w and depth h. As shown in FIG. 2, state b), the groove 5 created in this way has two side surfaces 10 extending essentially parallel to each other and an essentially plane bottom surface 11 extending essentially parallel to the upper surface of the waveguide layer 3 or lower surface of the substrate 2, i.e. the bottom surface 11 extends in the x-z plane.

FIG. 2, state c) shows the photonic chip 1 in a state in which the inner side surfaces 10 of the groove 5 have already been coated with an appropriate material, wherein coatings 6 have been created. The distance between the two inner surfaces of the coatings 6 of the side surfaces 10 of the groove 5 is smaller than the diameter of the optical fiber 7 to be received therebetween. The difference between the distance between the two surfaces of the coating 6 and the diameter of the optical fiber 7 is chosen as explained above.

FIG. 2, state d) shows the optical chip in the same manufacturing state as FIG. 2, state c) together with the optical fiber 7 to be inserted into the groove 5. The arrow shown beneath the optical fiber 7 designates the direction in which the optical fiber 7 is inserted into the groove 5. The distance of elastic deformation Δx of the coatings 6 on each side of the groove 5 induced by the insertion of the optical fiber 7 into the groove 5 is apparent from FIG. 2, state d). The cross-sectional view of the optical fiber 7 shows the fiber core 12 which defines the optical axis. The optical axis is identical with the longitudinal (geometrical) axes of the optical fiber 7 if the core 12 is exactly centered within the fiber, i.e. the outer diameter of the fiber 7 and the (usually circular) fiber core 12 are provided in a fully coaxial manner. If so, the optical axis of the optical fiber 7 can be positioned with respect to the optical axis of the photonic integrated waveguide 4 by simply using the outer diameter of the fiber 7.

FIG. 2, state e) shows an optical device 100 according to the invention which comprises a photonic chip 1 according to the invention and an optical fiber 7 affixed to the photonic chip 1.

Figure 3:
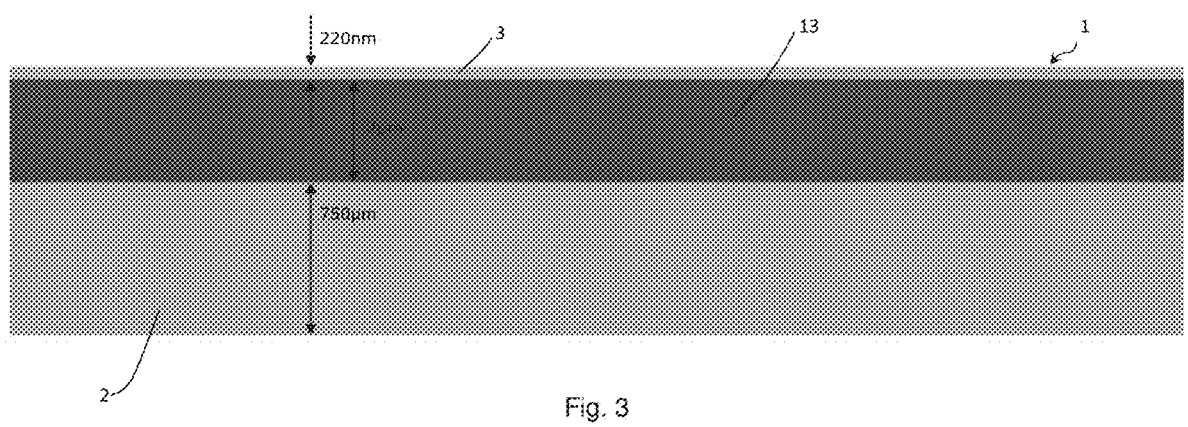
FIG. 3 shows a cross-sectional view of a photonic chip without a groove.

FIG. 3 shows a cross-sectional view of a photonic chip 1 without a groove 5 and without photonic waveguides that are to be created by processing the waveguide layer 3. According to this Figure, the photonic chip 1 may comprise a substrate 2, an insulator layer 13 and a waveguide layer 3. The insulator layer 13 is located on one side of the surface of the substrate 2, which is preferably a planar substrate. Preferably on the insulator layer 13 is located the waveguide layer 3. As shown in FIG. 3, in a most preferred embodiment, the thickness of the substrate 2 is 750 μm, the thickness of the insulator layer 13 is 2 μm and the thickness of the waveguide layer is 220 nm. However, every embodiment shown in the Figures may also be accomplished without an insulator layer 13.

Figure 4:
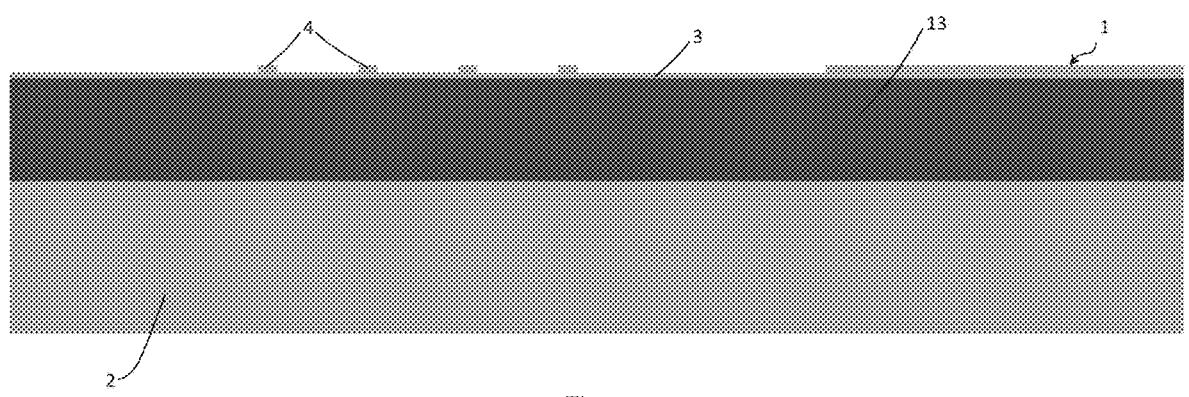
FIG. 4 shows a cross-sectional view of a photonic chip according to FIG. 3 wherein the waveguide layer is processed.

FIG. 4 shows a cross-sectional view of a photonic chip 1 according to FIG. 3 wherein the waveguide layer 3 is processed. The processing of the waveguide layer 3 is usually carried out by means of etching. By doing so, photonic integrated waveguides 4 and, as the case may be, other integrated optical elements, like optical couplers, Mach-Zehnder interferometers etc, are created "on the surface" (strictly speaking, in the upper region) of the waveguide layer 3.

Figure 5:
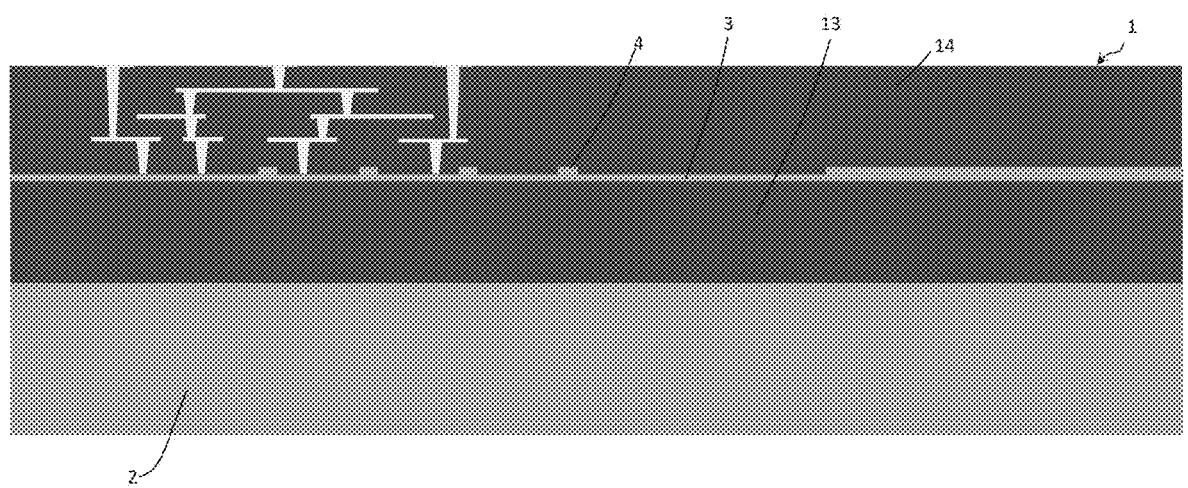
FIG. 5 shows a cross-sectional view of a photonic chip according to FIG. 4 wherein a passivation layer is applied on the waveguide layer.

After processing of the waveguide layer 3 to obtain at least one photonic integrated waveguide 4, a so-called passivation layer 14 is created on the waveguide layer 3 that comprises the photonic integrated waveguide 4. This state of the photonic chip is shown in FIG. 5. On the waveguide layer 3 may further be deposited a metallization layer (not shown). In this case the passivation layer 14 houses the waveguide layer 3 and the metallization layer. The presence of a passivation layer 14 has the advantage that the evanescent portions of the electromagnetic field guided by the photonic integrated waveguide 4, i.e. the optical field outside the waveguide 4, extends within the passivation layer 14 and thus cannot be influenced by changes of the conditions outside the waveguide 4. However, every embodiment shown in the Figures may also be accomplished without a passivation layer 14.

Figure 6:
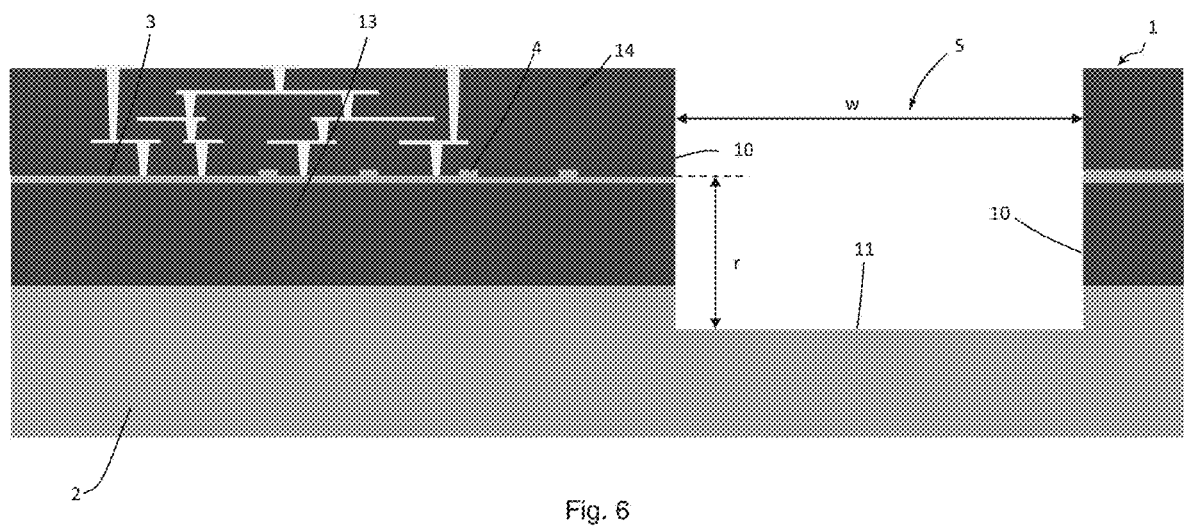
FIG. 6 shows a cross-sectional view of a photonic chip according to FIG. 5 wherein a groove is etched.

FIG. 6 shows a cross-sectional view of a photonic chip 1 according to FIG. 5 in which a groove 5 is etched. The groove 5 is a U-shaped groove with two side surfaces 10 and the bottom surface 11. The width w of the groove 5 is larger than the diameter of the optical fiber 7 to be received.

The distance r designates the distance between the optical axis of the photonic integrated waveguide 4 and the bottom surface 11 of the U-shaped groove. This distance shall be equal to the radius of the optical fiber 7 to be inserted into the groove 5 in order to achieve an optimal alignment between the optical fiber 7 and the photonic integrated waveguide 4. Of course, a core eccentricity of the optical fiber 7 might induce a respective additional attenuation even if the distance r exactly matches the fiber radius. As can be seen from FIG. 6, the depth of the groove 5 is preferably such that the bottom surface 11 of the groove 5 is formed from the material of the substrate 2, i.e. no coating of the elastic material is provided on the bottom surface 11. This facilitates an exact alignment of the optical fiber 7 irrespective of the elastic properties of an elastic coating.

Figure 7:
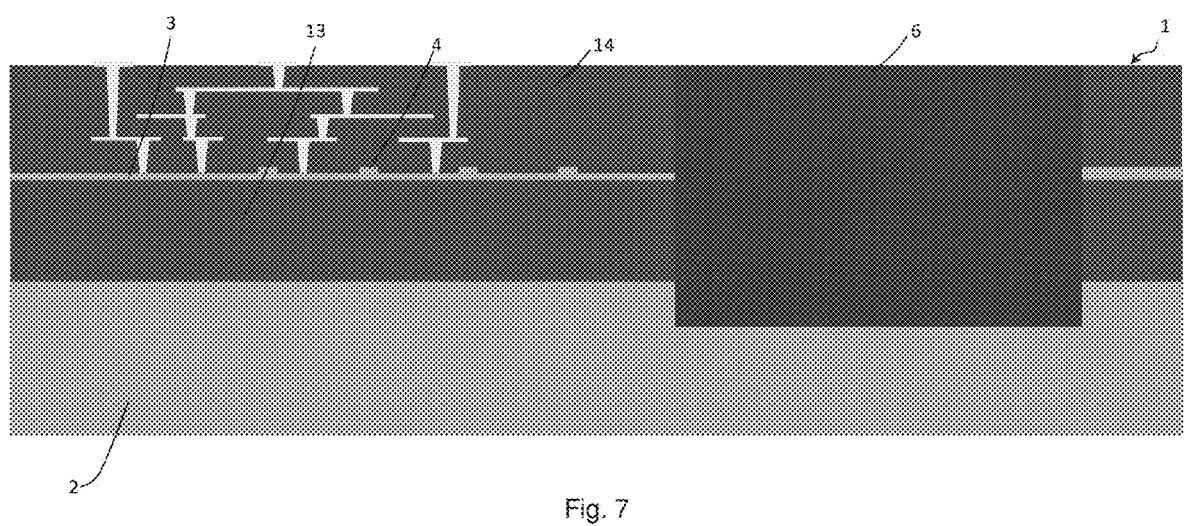
FIG. 7 shows a cross-sectional view of a photonic chip according to FIG. 6 wherein the groove is filled with an elastic material.

FIG. 7 shows a cross-sectional view of a photonic chip 1 according to FIG. 6 wherein the groove 5 is completely filled with the elastic material which has been chosen in order to form the coatings 6. In other words, the photonic chip 1 is preferably produced in such a way that in a first step the etched U-shaped groove is essentially completely filled with the coating material and in a second step the coating material is removed in a middle portion of the groove 5 by an etching process, wherein the coatings 6 remain in the groove 5. As mentioned above, known masking and etching methods may be used for these process steps.

Figure 8:
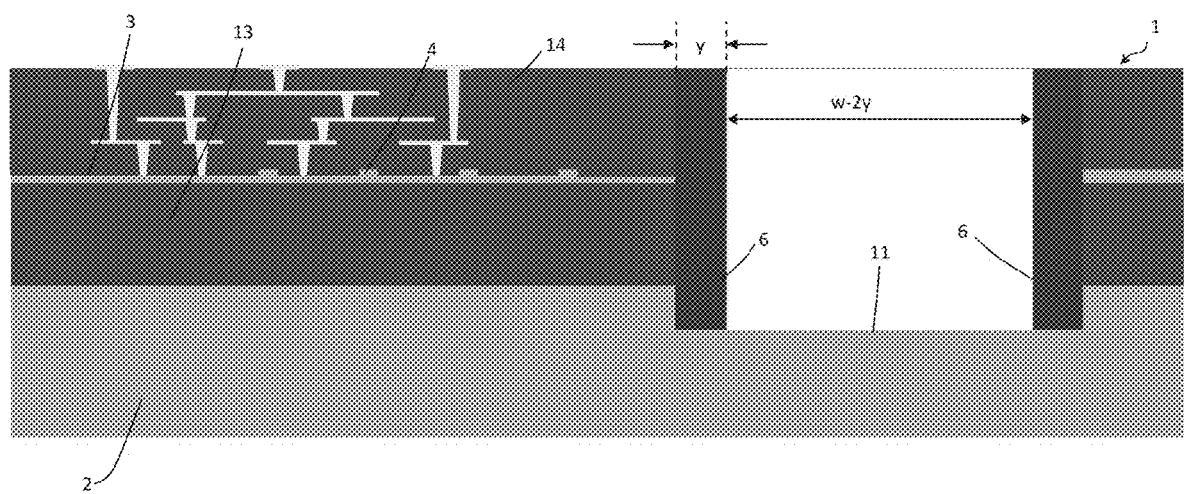
FIG. 8 shows a cross-sectional view of a photonic chip according to FIG. 7 wherein the elastic material is partly removed to obtain a groove wherein the inner side surfaces are coated.

The photonic chip 1 produced in this way is shown in FIG. 8. As apparent from this Figure, the masking and etching process has been conducted in such a way that both coatings 6 of the inner side surfaces 11 have the same thickness y. This ensures that the optical fiber 7 can be inserted into the groove 5 in such a way that the geometrical axis of the optical fiber has essentially the same distance to each of the side surfaces 10 of the groove 5. As mentioned above, the partial removal of the coating material is done in such a way that the bottom surface 11 of the groove 5 is formed by the material of the substrate 1 and no coating is present on the bottom surface 11. The thickness of the coatings 6 and thus the distance w-2y between the two inner surfaces of the coatings 6 is made an appropriate amount smaller than the diameter of the optical fiber 7.

Figure 9:
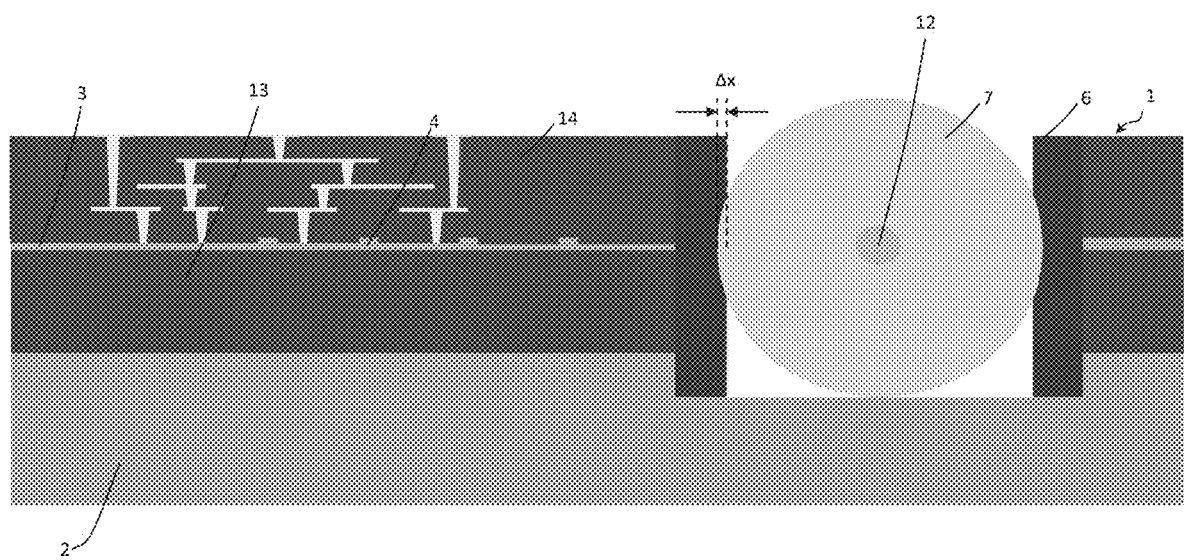
FIG. 9 shows a cross-sectional view of a photonic chip according to the invention wherein an optical fiber is clamped between the inner side surfaces of the groove.

FIG. 9 shows the cross-sectional view of a photonic chip 1 according to FIG. 8, wherein an optical fiber 7 is received in the groove 5 and held in place due to the elastic forces exerted onto the optical fiber by the coating material. The distance Δx is half of the difference between the distance w-2y and the outer diameter of the optical fiber 7.

As apparent from FIGS. 5 to 9, a photonic chip comprising a passivation layer 14 above the waveguide layer 3 has the advantage that the depth of the U-shaped groove 5 is considerably larger than the radius of the optical fiber 7, as the groove 5 is confined by the passivation layer 14 in its upper region, i.e. the upper portion of the side surfaces 10 are formed by material of the passivation layer 14. The greater depth of the groove 5 leads to elastic forces that are exerted onto the optical fiber 7 in a region above the plane of the waveguide layer 3 as apparent from FIG. 9. As a result, the optical fiber 7 is securely held within the groove 5.

LIST OF REFERENCE SIGNS

1 photonic chip
1a lateral end
2 substrate 3 waveguide layer
4 photonic integrated waveguide
5 groove
6 coating
7 optical fiber
8 front end portion (photonic integrated waveguide)
9 front end portion (optical fiber)
10 side surface
11 bottom surface
12 fiber core
13 insulator layer
14 passivation layer
100 optical device
w width of the groove
h depth of the groove
y thickness of the coating
Δx distance of elastic deformation of one side of the coating induced by the insertion of the optical fiber into the groove
r distance between optical axis of the photonic integrated waveguide and bottom surface of the U-shaped groove
w-2y distance between the two surfaces of the coatings of the side surfaces of the groove

The invention claimed is:

1. A photonic chip comprising a connecting means for aligning and connecting an optical fiber to a photonic integrated waveguide provided on the photonic chip,
    (a) wherein the photonic chip at least comprises a substrate and a waveguide layer, which is provided on or within an upper portion of the substrate and which defines the photonic integrated waveguide,
    (b) wherein the photonic integrated waveguide and the optical fiber each have a front end portion, each front end portion having an optical axis and a front surface,
    (c) wherein the connecting means comprises a groove configured to receive the front end portion of the optical fiber, in such a way that front surfaces of the photonic integrated waveguide and the optical fiber are positioned opposite each other and that the optical axes of the photonic integrated waveguide and the optical fiber are essentially aligned with each other, and
    (d) wherein the groove is essentially U-shaped in its cross section, the groove has a bottom surface and two inner side surfaces, and at least one of the two inner side surfaces of the U-shaped groove has a coating of an elastic material configured to hold in place the optical fiber after it is inserted into the groove, wherein the thickness of the layers of the photonic chip and depth of the groove are chosen such that the bottom surface of the groove is formed by the material of the substrate, and wherein at least a portion of the optical fiber inserted into the groove physically and directly contacts the bottom surface of the groove formed by the material of the substrate without other material between said portion of the optical fiber and the material of the substrate.

2. The photonic chip of claim 1, wherein both inner side surfaces of the U-shaped groove have a coating of an elastic material configured to hold in place the optical fiber after it is inserted into the groove.

3. The photonic chip of claim 1, wherein the groove is provided on a waveguide layer side of the chip, and the bottom surface of the groove is parallel to the optical axis of the end portion of the photonic integrated waveguide.

4. The photonic chip of claim 1, wherein the groove extends from a lateral end of the photonic chip to the front surface of the front end portion of the photonic integrated waveguide.

5. The photonic chip of claim 1, wherein the inner side surfaces of the U-shaped groove have an essentially constant distance which is greater than the diameter of the end portion of the optical fiber and wherein the coating(s) of the inner side surface(s) has/have essentially constant thickness(es) chosen in such a way that the distance of the inner side surfaces after coating is smaller than the diameter of the front end portion of the optical fiber.

6. The photonic chip of claim 1, wherein the distance between the bottom surface of the groove and the optical axis of the front end portion of the photonic integrated waveguide is essentially equal to the radius of the optical fiber.

7. The photonic chip of claim 1, wherein the coating(s) of the inner side surface(s) of the U-shaped groove is/are configured such that the optical fiber is clamped between the coated inner side surfaces of the U-shaped groove.

8. The photonic chip of claim 2, wherein the coatings of both sides of the inner side surfaces of the U-shaped groove have essentially the same thickness.

9. The photonic chip of claim 1, wherein the front end portion of the photonic integrated waveguide has the form of a taper.

10. An optical device comprising a photonic chip and an optical fiber connected to a photonic integrated waveguide provided on the photonic chip by connecting means,
    (a) wherein the photonic chip comprises a substrate and a waveguide layer which is provided on or within an upper portion of the substrate and which defines the photonic integrated waveguide,
    (b) wherein the photonic integrated waveguide and the optical fiber each have a front end portion, each front end portion having an optical axis and a front surface,
    (c) wherein the connecting means comprise a groove configured to receive the front end portion of the optical fiber, in such a way that front surfaces of the photonic integrated waveguide and the optical fiber are positioned opposite each other and that the optical axes of the photonic integrated waveguide and the optical fiber are essentially aligned with each other, and
    (d) wherein the groove is essentially U-shaped in its cross section, the groove has a bottom surface and two inner side surfaces, and at least one of the two inner side surfaces of the U-shaped groove has a coating of an elastic material configured to hold in place the optical fiber after it is inserted into the groove, wherein the thickness of the layers of the photonic chip and depth of the groove are chosen such that the bottom surface of the groove is formed by the material of the substrate, and wherein at least a portion of the optical fiber inserted into the groove physically and directly contacts the bottom surface of the groove formed by the material of the substrate without other material between said portion of the optical fiber and the material of the substrate.

11. The optical device of claim 10, wherein both inner side surfaces of the U-shaped groove have a coating of an elastic material configured to hold in place the optical fiber after it is inserted into the groove.

12. The optical device of claim 10, wherein the front end portion of the optical fiber has a tapered front end portion and/or a lensed tip of the front end portion.

13. The optical device of claim 10, wherein the front end portion of the optical fiber is additionally mechanically fixated to the chip.

14. A method of producing the photonic chip according to claim 1, comprising:
(a) providing a photonic chip comprising a substrate and a waveguide layer which is provided on or within an upper portion of the substrate and which defines a photonic integrated waveguide, wherein the photonic integrated waveguide has a front end portion, which has a front surface and an optical axis;
(b) etching a U-shaped groove having a bottom surface and two inner side surfaces into the photonic chip, the groove essentially extending from the front surface of the front end portion of the photonic integrated waveguide in the direction of the optical axis of the front end portion of the photonic integrated waveguide; and
(c) applying a coating of an elastic material on at least one of the inner side surfaces of the U-shaped groove,
(d) wherein the groove and the coating(s) of the inner side surfaces are configured to receive and hold in place a front end portion of an optical fiber with at least a portion of the optical fiber physically and directly contacting the bottom surface of the groove formed by a material of the substrate without other material between said portion of the optical fiber and the material of the substrate.

15. The method according to claim 14, wherein the applying the coating of the elastic material on at least one of the inner side surfaces of the U-shaped groove is carried out by filling the groove with the elastic material and subsequently removing a central portion of the elastic material by etching in such a way that the coating remains on at least one of the inner side surfaces.

16. The method according to claim 14, wherein the etching of the elastic material is carried out by using an etching process which does not attack the material of the substrate.

17. The optical device according to claim 13, wherein the optical fiber is mechanically fixated to the chip by gluing.

18. The photonic chip of claim 2, wherein the groove is provided on a waveguide layer side of the chip, and the bottom surface of the groove is parallel to the optical axis of the end portion of the photonic integrated waveguide.

19. The method according to claim 16, wherein the etching process uses an etching material.

20. The method according to claim 16, wherein the etching process does not attack the material of the substrate.

* * * * *